(12) United States Patent
Mankame et al.

(10) Patent No.: US 7,797,933 B2
(45) Date of Patent: Sep. 21, 2010

(54) SERVO SYSTEM AUGMENTED WITH AN ACTIVE MATERIAL COMPONENT

(75) Inventors: Nilesh D. Mankame, Ann Arbor, MI (US); Norman K. Bucknor, Troy, MI (US); Alan L. Browne, Grosse Pointe, MI (US); Paul W. Alexander, Ypsilanti, MI (US); Brian W. Whitmarsh, Commerce, MI (US); Nancy L. Johnson, Northville, MI (US); Stephen W. Powell, South Lyon, MI (US); Patrick B. Usoro, Troy, MI (US); Xiujie Gao, Troy, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 401 days.

(21) Appl. No.: 12/014,945

(22) Filed: Jan. 16, 2008

(65) Prior Publication Data

US 2009/0178397 A1 Jul. 16, 2009

(51) Int. Cl.
F15B 21/00 (2006.01)
F01L 1/00 (2006.01)
B60T 8/17 (2006.01)

(52) U.S. Cl. ........................................................ 60/329
(58) Field of Classification Search ................... 60/329
See application file for complete search history.

(56) References Cited

U.S. PATENT DOCUMENTS

| 5,099,884 | A | | 3/1992 | Monahan |
| 5,452,745 | A | | 9/1995 | Kordonsky et al. |
| 5,588,717 | A | * | 12/1996 | Kim et al. .................. 303/84.2 |
| 5,622,413 | A | * | 4/1997 | Kim et al. ................. 303/119.2 |
| 6,378,558 | B1 | | 4/2002 | Pohl et al. |

FOREIGN PATENT DOCUMENTS

JP 07217609 A 8/1995
KR 100643152 B1 10/2006

* cited by examiner

Primary Examiner—Thomas E Lazo
(74) Attorney, Agent, or Firm—Quinn Law Group, PLLC (57) ABSTRACT

A servo system includes pressurized fluid, and one or more fluid control devices (FCD) such as a valve or actuator, with at least one FCD having an element with a variable property that varies in response to a stimulus. The FCD controls a flow rate or pressure transmission of the fluid within the servo system. The element may include an active return spring having a variable stiffness. The servo system may operate as an interlock system for a transmission. A method for moving an output load using a servo system includes providing a first FCD with an active element, connecting an output load to a second FCD, activating the active element with a stimulus to vary a property of the active element, transmitting a force from the pressurized fluid to the second FCD, and moving the output load from a first position to a second position in response to the force.

19 Claims, 8 Drawing Sheets

SERVO SYSTEM AUGMENTED WITH AN ACTIVE MATERIAL COMPONENT

TECHNICAL FIELD

The present invention relates to a fluid-based servo system having a fluid control device that is augmented by an active material component for thereby improving a response time of the servo system, as well as for reducing the effects on the servo system response on a changing viscosity and/or temperature of the system fluid.

BACKGROUND OF THE INVENTION

Pressurized fluid may be used to provide a reliable source of energy for moving various actuator devices, such as in systems having fluid motors, valves, or movable pistons, the motion of which in turn may be used to move or drive various output loads, such as interconnected mechanical rods, levers, or other linkages, to achieve a desired result. Pressurized fluid may be used with various servo control systems in industrial processes to move a specific load in a controlled fashion, thus enabling a desired rotary and/or linear motion.

For example, an automotive transmission may utilize a fluid-based servo system in a parking brake or interlock system to provide a positive restraint against motion of the vehicle when the vehicle is parked, i.e. when a transmission equipped with such a mechanical interlock system is set in a park or "P" position. Likewise, the interlock system may be selectively disengaged whenever the transmission is placed in an out-of-park or "OP" position. An interlock system therefore helps ensure that any motion of a vehicle equipped with such a system is enabled only when the transmission is set in or shifted to an out-of-park (OP) position.

SUMMARY OF THE INVENTION

In a fluid-based servo system, i.e. a servo system that is selectively actuated using pressurized fluid, the time required for actuating the system and ultimately moving any output load connected to the servo system increases in conjunction with changing fluid viscosity. The viscosity of the fluid in turn changes in response to the changing fluid temperature, increasing when the temperature drops and decreasing when the temperature rises. Therefore, a servo system in accordance with the invention not only reduces the response time required for engagement and disengagement of an output load, exemplified herein as a mechanical interlock system usable within a transmission, but not limited thereto, by using one or more active material components. The active material augmentation of the servo system also serves to make the response time less dependent on the viscosity or temperature of the fluid. In particular, various "active" materials as described later hereinbelow may be used with different fluid-powered actuator devices and/or within certain fluid passages. Actuation speeds or response times of systems, such as the interlock system described herein, that rely at least partially on fluid actuation may therefore be optimized within a wide range of temperatures.

In accordance with the invention, a fluid-based servo system includes one or more elements or components constructed at least partially of a suitable active material as described herein. Changes produced in the active materials by a stimulus assist the movement of fluid produced by a fluid control device (FCD), such as a valve or an actuator within the servo system, and/or that act to facilitate or hinder a flow of fluid through the servo system. For example, a speed of operation of a valve and/or an actuator such as a piston device may be increased using active elements. Likewise, flow rates through critical fluid passages of a fluid circuit of the servo system may be optimized using active elements that variably restrict the effective diameter of the fluid passages in response to a stimulus that may be based on, for example, a user input, signals from one or more sensors, a magnetic field, photochemical activation, a passively sensed condition, or using a controller whose operational logic is based on a combination of one or more of the above.

In one aspect of the invention, a servo system is configured for selectively moving an output load, and includes a fluid control device (FCD) in fluid communication with a supply of pressurized fluid. The FCD has at least one active element constructed of an active material. The FCD controls an application of the pressurized fluid within the servo system to move the output load, with the active material having a variable property that varies in response to a stimulus to optimize the response of the servo system.

In another aspect of the invention, the FCD is a valve having the at least one active element, and a stimulus applied to the active element varies the property to thereby change a flow rate of the pressurized fluid through the FCD.

In another aspect of the invention, the FCD is a servo valve having a moveable spool portion that is operatively connected to the active element, and that is moveable in response to the force from the pressurized fluid. Application of the stimulus to the active element varies a speed of movement of the spool portion to thereby change the flow rate through the FCD.

In another aspect of the invention, the FCD is a valve having a fluid passage that is operatively connected to the active element. The servo system modifies an effective diameter of the fluid passage by applying a stimulus to the active element.

In another aspect of the invention, the FCD is an actuator device having a moveable portion that is operatively connected to at least one active element. Application of a stimulus to the active element varies a speed of movement of the moveable portion optimize a time required for moving the output load.

In another aspect of the invention, the actuator device is a fluid motor has a rotor portion, and at least one active element is operatively connected to the rotor portion and configured for applying a rotational force to the rotor portion.

In another aspect of the invention, the active element is a return spring for applying a return force to a moveable portion of the FCD. The return spring has a variable spring stiffness that varies in response to the stimulus.

In another aspect of the invention, the supply of pressurized fluid has a variable viscosity, and is either a magnetorheological fluid, an electrorheological fluid, or a pseudo-plastic fluid.

In another aspect of the invention, a servo system includes a supply of pressurized fluid, a fluid control device (FCD) having a moveable portion and being a valve or a piston, and an output load that is moveable from a first position to a second position in response to a movement of the moveable portion. The FCD includes an active element at least partially constructed of an active material and having a variable property, and an application of a stimulus to the active element varies the variable property to optimize an amount of time required for moving the output load from the first position to the second position, and/or to make the response time less dependent on the viscosity or temperature of the fluid.

In another aspect of the invention, the servo system includes a servo valve having a moveable spool portion biased by an active element embodied as a return spring constructed of an active material, and having a variable stiffness that varies in response to the applied stimulus.

In another aspect of the invention, the servo system includes a second active element connected to the moveable spool portion and having a variable length, which varies in response to the stimulus to facilitate movement of the moveable spool portion.

In another aspect of the invention, a method for moving an output load using a servo system includes providing a first fluid control device (FCD) with a first active element, connecting the output load to a second FCD, and activating the first active element using a first stimulus to vary the first variable property. The activation step transmits force from a supply of pressurized fluid through the first FCD to the second FCD, and thereby moves the output load from a first position to a second position.

In another aspect of the invention, the method provides the second FCD with a second active element, and activates the second active element using a second stimulus to vary a second variable property of the second active element.

In another aspect of the invention, the method includes configuring a portion of the output load as a locking member for a vehicle transmission, and selectively locking the vehicle transmission in a park position by moving the locking member for the first position to the second position.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Referring to the drawings wherein like reference numbers correspond to like or similar components throughout the several figures, and beginning with FIG. 1A, a fluid-based servo system 10, referred to hereinafter for simplicity as the servo system 10, includes a low-pressure tank or reservoir 16, which is abbreviated "R" in FIG. 1A, and a pump 30, which is abbreviated "P" in FIG. 1A. The pump 30 is operable for pressurizing a supply of fluid, such as oil, coolant, or another suitable fluid type. The pressurized fluid, represented hereinafter as arrow HP, may be directed through various interconnected fluid passages 29, for example piping, hose, and/or flexible tubing, to one or more fluid control devices (box FCD), as will be described hereinbelow.

Within the scope of the invention, the fluid control devices (FCD) 36 may be any device operable for controlling an application of a supply of pressurized fluid (arrow HP) within the servo system 10. As used herein, "controlling an application of pressurized fluid (arrow HP)" refers to selectively moving and/or directing a supply of pressurized fluid through the servo system 10 to ultimately apply or transmit a force or pressure from the pressurized fluid (arrow HP) to any portion of the servo system 10 and/or to an output load connected thereto. As shown in FIGS. 1B and 1C, an output load may be embodied as an actuator rod 14 and/or various interconnected levers or output loads 11A, 11B, and/or 11C, but which may take the form of other output loads within the scope of the invention. The FCD 36 may be configured as a valve device, i.e. as one or more servo valves, on/off fluid valves, solenoid-assisted valves, and/or variable flow restrictor-type valves, as well as an actuator device, i.e. one or more piston/cylinder devices, fluid motors, fluid turbines, and/or other such linear or rotary actuator devices, as will be understood by those of ordinary skill in the art.

In some embodiments, the FCD 36 may include a moveable portion as described below that slides, rotates, compresses, or otherwise moves in response to the supply of pressurized fluid (arrow HP), and which may actuated by a signal from a controller 19, also abbreviated "C" in FIG. 1A. Also, within the scope of the invention at least one of the FCD 36 includes an active element constructed of or using an active material which has at least one variable property, i.e. a physical property that varies in response to an applied stimulus for augmenting or assisting a motion of the moveable portion of the FCD 36 when so equipped, or alternately for selectively restricting a flow passage for changing a flow rate of the pressurized fluid (arrow HP) through the FCD 36, as will be described below. The controller 19 therefore has a method or algorithm 100 configured or adapted for activating one or more active elements in response to a condition sensed by one or more sensors 34, also abbreviated "S" in FIG. 1A, or manually as described later hereinbelow.

Figure 1A:
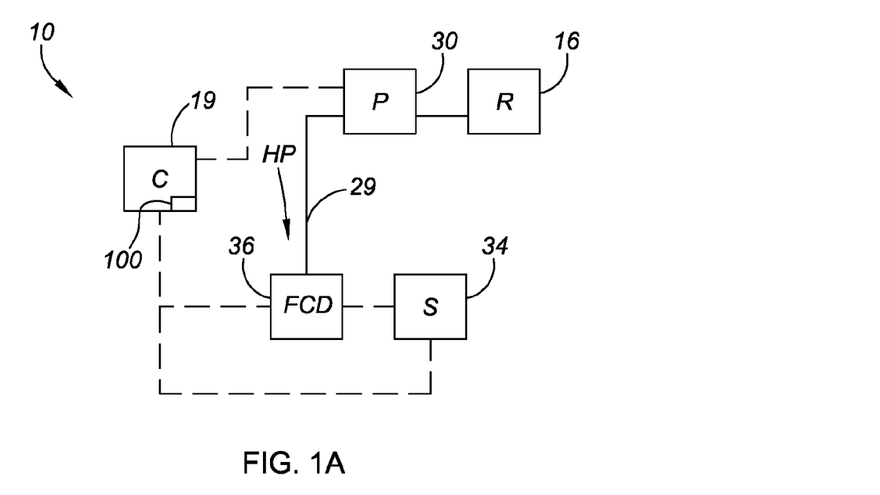
FIG. 1A is a schematic illustration of a servo system according to the invention.
Figure 1B:
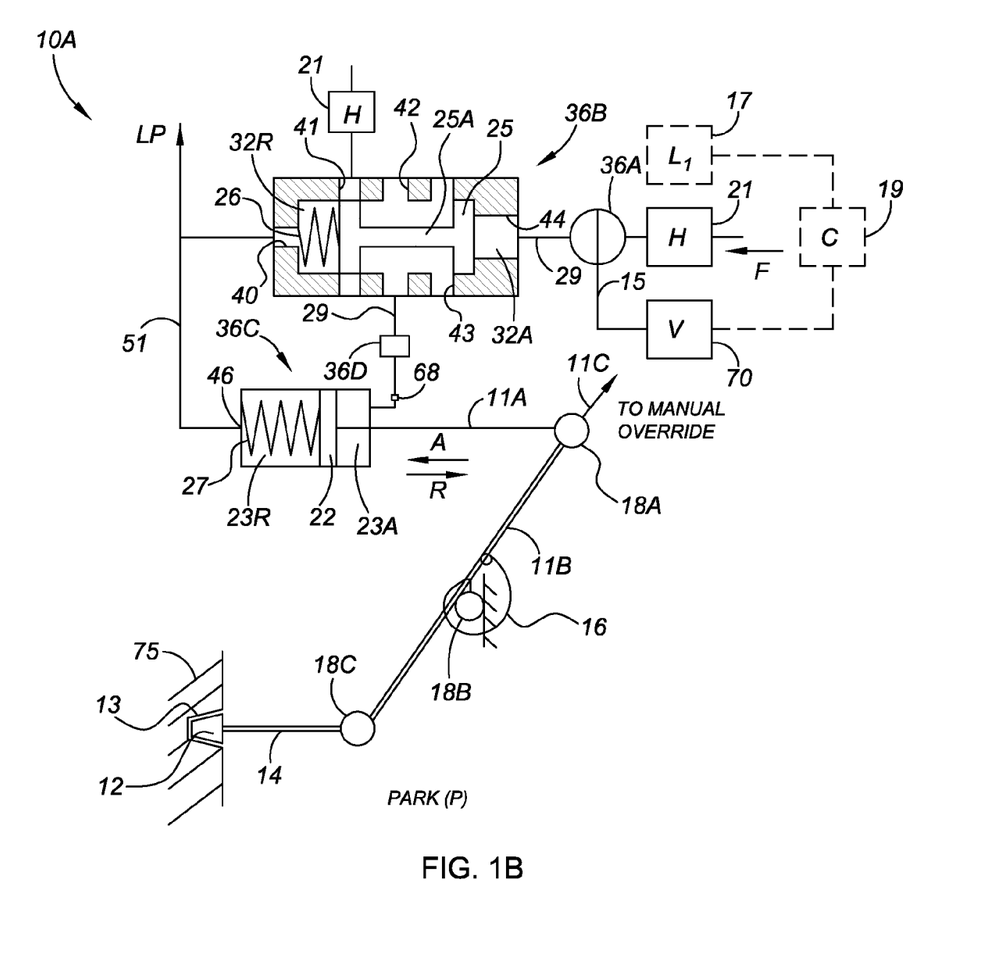
FIG. 1B is a schematic illustration of an exemplary transmission interlock system embodiment of the servo system of FIG. 1A, while in a park (P) position.
Figure 1C:
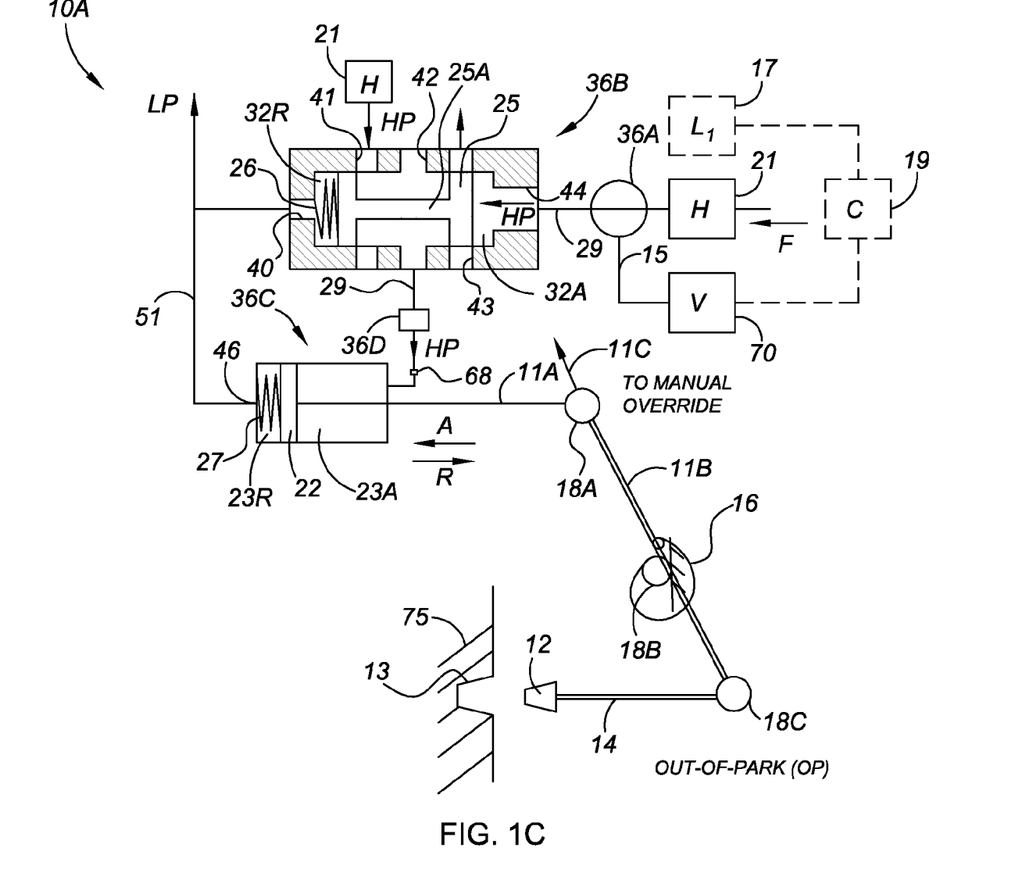
FIG. 1C is a schematic illustration of the transmission interlock system of FIG. 1A while in an out-of-park (OP) position.

Referring to FIG. 1B, the servo system 10 of FIG. 1A is shown in one embodiment as a transmission interlock system 10A for a vehicle (not shown), referred to hereinafter for simplicity collectively as the interlock system 10A. However, the motion enabled by the servo system 10 of the invention may be used to move or position other devices within the scope of the invention, such as for example a vehicle suspension or height adjustment system. The interlock system 10A is operable for use within a vehicle transmission, portions of which are shown as a first and second output loads or levers 11A and 11B, respectively, and a member 75 that is coupled with one or more wheels (not shown) of the vehicle. The interlock system 10A is shown in FIG. 1B as it would appear when set to a first position, i.e. a park (P) position. A shift selector 17 (box $L_1$) may be a user-selectable lever, switch, button, and/or other such user-operated device, the motion of which generates or commands a signal via the controller 19 in response to a predetermined and/or sensed condition from the sensor or sensors 34 (se FIG. 1A). The interlock system 10A also includes a manual override lever 11C, which a user of the interlock system 10A may use to manually position the interlock system 10A into a park (P) or out-of-park (OP) position irrespective of the status of the controller 19 whenever a hydraulic system providing the pressurized fluid (arrow HP) is de-energized.

The interlock system 10A includes one or more FCD 36 (see FIG. 1), which may include, but which is not limited to, a solenoid valve 36A, a servo valve 36B, a cylinder device 36C having a piston 22, and/or a flow restrictor device 36D. A magnet 68 or other activation source may be positioned within one or more fluid passages, such as when using magnetorheological fluid as described below. A plurality of output loads 11A and 11B, shown in FIGS. 1B and 1C as levers or linkages, are operatively connected to an actuator rod 14, which is automatically or manually moveable to achieve a park (P) position of FIG. 1B or an out-of-park (OP) position (see FIG. 1C). That is, when the park (P) position is commanded, the servo valve 36B and the cylinder device 36C return to a de-energized or substantially depressurized state as shown in FIG. 1B. Likewise, when an out-of-park position (OP) is commanded, the servo valve 36B and other active devices are energized or pressurized as described below. In turn, the servo valve 36B ultimately transmits or delivers the supply of pressured fluid (arrow HP) to the cylinder 36C or other actuator device, and may transmit the pressurized fluid through at least one flow restrictor device 36D to variably restrict the flow as described below, thus ultimately moving a piston 22 disposed in the cylinder device 36C. Motion of the piston 22 within the cylinder 36C moves the output loads 11A and 11B to pull the rod 14 in the direction of arrow R, thus setting or positioning the interlock system 10A into a first position, i.e. the park (P) position as shown in FIG. 1B.

More particularly, the cylinder device 36C has an apply chamber 23A opposed by a return chamber 23R. The return chamber 23R contains a return spring 27 and a low-pressure (LP) fluid outlet 46, which is in fluid communication with a low-pressure fluid passage 51. The output load 11A is operatively connected to the piston 22 and to a first node or pivot 18A. The output load 11B is connected to the first pivot 18A and to a third node or pivot 18C. One end of the rod 14 is also connected to the third pivot 18C, with another end of the rod 14 connected to or formed integrally with a suitably shaped locking "bullet" or locking member 12. A notch 13 is formed or provided in the member 75 of the transmission, which is coupled to the wheels (not shown) as described above, and is sufficiently shaped and sized to receive the locking member 12 therein. The interlock system 10A therefore locks a transmission output shaft (not shown) via the member 75, thus preventing rotation of the output shaft and any interconnected drive wheels (not shown).

The servo valve 36B includes a high-pressure (HP) fluid control port 44, a pair of fluid outlets 42 and 43, and a HP fluid inlet 41. A low-pressure (LP) fluid outlet 40 is also provided within the servo valve 36B. The servo valve 36B contains a moveable piston portion or spool 25 that separates an apply chamber 32A from a return chamber 32R, with a return spring 26 disposed within the return chamber 32R and biasing the spool 25. The spool 25, which includes an axial spool portion 25A as shown, is in fluid communication with a pressure inlet valve 36A, such as an electromechanical, hydraulic, or pneumatic valve, which may be assisted by a solenoid, via the fluid channel 29. The inlet valve 36A may be electrically connectable to a voltage source 70, such as a battery, via a circuit connection 15 if equipped with an electrically-actuated solenoid. Regardless of its particular configuration, the inlet valve 36A is in fluid communication with a controlled fluid pressure (arrow HP, also see FIG. 1C), so that actuation of the inlet valve 36A admits fluid pressure (arrow HP) into the servo valve 36B, and the same fluid pressure (arrow HP) is blocked by the inlet valve 36A when the inlet valve is not actuated. In this manner the inlet valve 36A acts as a selectively actuated "on/off" fluid control device for the interlock system 10A.

When the transmission is to be placed in an out-of-park (OP) position using the hydraulic system, the controller 19 turns off the inlet valve 36A to prevent fluid pressure (arrow HP) from being exerted or applied at the HP fluid control port 44 of the servo valve 36B. Instead, the HP fluid control port 44 is vented to low pressure. Within the servo valve 36B, any residual fluid pressure (arrow HP) previously supplied to the apply chamber 32A, which would tend to move the spool 25 in the direction of arrow A, is then reduced below a level of return force in the direction of arrow R supplied by the return spring 26. The return spring 26 is then allowed to move the spool 25 to the out-of-park (P) position shown in FIG. 1C. To enable proper biasing of the output loads 11A and 11B and engagement of the system 10A, a torsion spring 16 is operatively connected to a pivot 18B on the output load 11B. Thus, absent a high fluid pressure (arrow HP) applied at the HP fluid control port 44 of the servo valve 36B, the return springs 26 and 27 and the torsion spring 16 operate to ensure that the interlock system 10A remains fully engaged, i.e. positioned in the "Park" (P) setting of FIG. 1B.

Referring to FIG. 1C, when a circuit connection 15 is closed, such as by closing a switch or relay (not shown), or when the inlet valve 36A is otherwise caused to open, pressurized fluid (arrow HP) is admitted into the apply chamber 32A. As this fluid pressure overcomes the biasing force provided by the return spring 26, the spool 25 moves in the direction of arrow A and compresses the return spring 26 within the return chamber 32R. This movement also connects the high pressure at HP fluid inlet 41 with the cylinder 36C via the fluid outlet 42. Any fluid pressure remaining within the return chambers 32R and 23R of the servo valve 36B and cylinder device 36C, respectively, is then relieved or drained via the respective LP fluid outlets 40 and 46.

Likewise, fluid pressure (arrow HP) admitted to the apply chamber 23A of the cylinder device 36C acts to overcome the biasing force of the return spring 27, thus compressing or deflecting the return spring 27 within the return chamber 23R, and the torsion spring 16 thus causes the output load 11A to pivot or move, thus moving the locking member 12 in the direction of arrow R. The interlock system 10A is disengaged or placed in an out-of-park (OP) position once the locking member 12 is fully separated from the notch 13.

Still referring to FIGS. 1B and 1C, sources of latency within the interlock system 10A, and particularly under sub-zero temperature conditions, may include the response time of the inlet valve 36A, as well as the time required for filling/pressurizing and/or draining/depressurizing the servo valve 36B and the cylinder device 36C to move the output loads 11A and 11B. Accordingly, the interlock system 10A of the invention may utilize one or more fluid heating devices or heaters 21, shown schematically as box "H", to increase a localized temperature at or through desired fluid passages and/or orifices. For example, fluid admitted to the HP fluid inlet 41 and HP fluid control port 44 may be first directed through a heater 21 to raise the fluid temperature and lower the fluid viscosity in proximity to the ports 41 and 44. Similar heaters 21 may also be used elsewhere within the interlock system 10A within the scope of the invention wherever relatively restricted openings, passages, and/or fluid ports are found, or a single heater 21 may be used within or in proximity to a fluid reservoir (not shown) to heat the supply of fluid it is directed to the interlock system 10A.

Additionally, the response times of various components of the interlock system 10A are improved or enhanced using selected active material components, as will be described later hereinbelow with reference to FIGS. 2A through 8. As used herein, the term "active material components", or alternately "active elements", refers generally to compositions having certain predetermined properties, such as stiffness, shape, dimensions, and/or material morphology or structure that may be selectively modified by introducing an external stimuli or "activation signal". Stimuli may include, but are not limited to, an applied electrical and/or magnetic fields, photo-chemical activation, external stresses, temperature fluctuations, moisture, and/or pH changes. For example, as will be described below, the voltage source 70 may be selectively connected to drive an electrical current through a conductor within or in proximity to an associated active component to generate the necessary heat for inducing a solid-state phase transformation, and/or to induce an electric and/or magnetic field around an active element, depending upon the application and the particular active component.

Although many active material components may be useable within the scope of the invention, a few types of active material components or active elements may be particularly useful within the interlock system 10A, such as electroactive polymers (EAP), shape memory alloys (SMA), magneto-rheological fluids, electro-rheological fluid (ERF), pseudo-plastic or shear-thinning fluids, piezoelectric materials, electro-strictive materials, and/or magneto-strictive materials.

Electroactive Polymers (EAP) include polymeric materials which respond in a particular manner to external electrical stimulation, such as an applied voltage, by a change of shape and/or size. Consequently, EAP are capable of converting electrical energy to a mechanical force and/or movement, and vice versa. EAP may be divided in two primary classes: dielectric EAP, in which actuation is caused by electrostatic forces between two electrodes which squeeze the polymer, and ionic EAP, in which actuation is caused by the conformational changes produced by the displacement of ions inside the polymer.

Shape memory alloys (SMA), sometimes referred to in the art informally as "smart materials", are materials or compositions exhibiting pseudo-elasticity and shape memory, and thus have the ability to "remember" their original shape. The original shape may be recalled subsequent to a deformation that changes its shape by applying an external stimulus (i.e., an activation signal). As such, deformation of the shape memory material from the original shape can be a temporary and reversible condition. These capabilities are due, in part, to a temperature and stress-dependent solid-state change of phase due to a cooperative atomic rearrangement. The two phases, i.e. the Martensite (m) phase and the Austenite (a) phase, refer to the lower and higher temperature phases, respectively, in which the phase transformation occurs from a low-symmetry (Martensite) to a highly symmetric (Austenite) crystallographic structure. SMAs represent a class of thermally-activated smart materials (TASM) that undergo a reversible phase transformation responsible for stress-induced and temperature-induced recoverable deformation behavior.

Piezoelectric materials are materials, traditionally crystalline structures and ceramics, which produce a voltage when a mechanical stress is applied thereto. Since this effect also applies in the reverse manner, a voltage applied across a sample piezoelectric material will produce a mechanical stress within the sample. For example, activation of a piezoelectric material can result in a change in dimension of approximately 0.1% for piezo-ceramics and 1% for piezo-polymers. Suitably designed structures made from these materials can therefore be made that bend, expand, or contract when a voltage is applied thereto.

Active materials may also be magnetostrictive or electrostrictive. The term "magnetostrictive" refers to the mechanical deformation that occurs in a ferromagnetic material when it is placed in a magnetic field. Active materials may therefore be selected with desired magnetostrictive properties so that they may change their length in a desired fashion when subjected to an induced electromagnetic field. Likewise, electrostrictive materials may change their stiffness or strain in response to an applied voltage.

Magneto-rheological (MR) fluid is a type of active material having a suspension of magnetizable particles, typically pure iron in the micron particle size range, suspended in a carrier fluid, typically hydrocarbon oil. When this fluid is exposed to a magnetic field, whether an induced magnetic field or one generated by a permanent magnet, the yield stress of the MR fluid increases by several orders of magnitude. This yield stress change is produced through the formation of columns of magnetizable particles across the gap containing the fluid in the direction of the applied magnetic field. This increase in yield stress can be used to control the fluid coupling between two rotating members, such as in a clutch, or change the flow rate of the fluid through a pipe, channel, or orifice. The change in yield stress is rapid, taking place in milliseconds, and is readily reversible.

Since the magnetic field can be rapidly controlled by the application of a current to a field coil, the yield stress of the fluid can be changed just as rapidly. Therefore, the servo system 10 of FIG. 1A, as embodied by an interlock system 10A as shown in FIGS. 1A and 1B, may use a suitable MR fluid instead of or in addition to heating the fluid with heaters 21. In this case, a magnetic field may be induced near a localized region of a particular flow path to vary the effective viscosity of the fluid in that region, thereby varying the localized flow resistance of the flow in that region. As the application of a magnetic field only serves to increase the apparent fluid viscosity over its de-magnetized state, the above approach is used in conjunction with a carrier fluid that has sufficiently high viscosity for rapid operation of the interlock system 10A, even at the low end of the operating temperature range. The viscosity is then increased as the temperature increased by the application of a magnetic field.

Shear-thinning fluids, e.g. whipped cream, honey, nail polish, etc., undergo a reduction in viscosity when they are shaken or stirred. If a shear-thinning fluid or blend containing a shear-thinning fluid is used in a transmission, its properties are tailored such that the rest state viscosity of the fluid is suitable for operation of the fluid system at normal temperatures. The viscosity of the fluid is reduced, such as by using a shear mixer in critical flow passages or in the reservoir when the system is to be used at relatively low temperatures.

Figure 2:
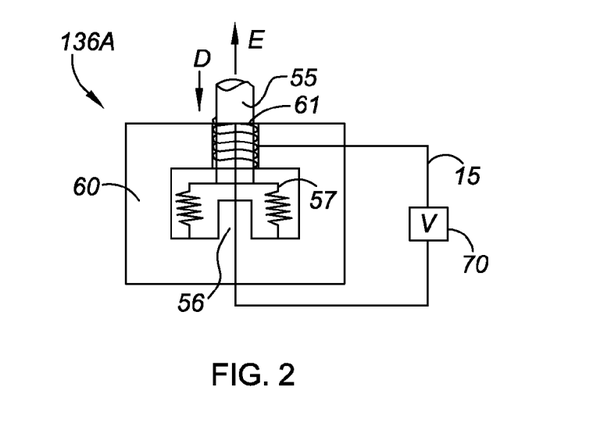
FIG. 2 is a schematic cross-sectional illustration of an active material-based solenoid device usable with a servo system such as shown in FIGS. 1A and 1B.
Figure 3:
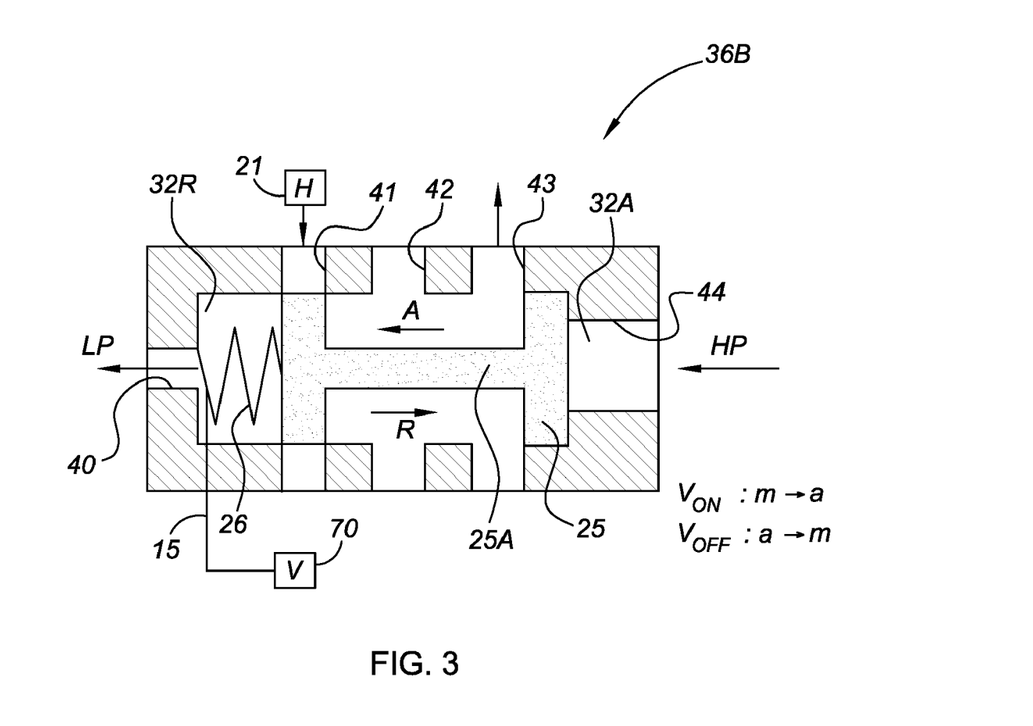
FIG. 3 is a schematic cross-sectional illustration of an active material-based servo valve usable with the transmission interlock system of FIGS. 1A and 1B.

Referring next to FIG. 3, and returning later hereinbelow to discuss the embodiment of FIG. 2, the servo valve 36B of FIGS. 1B and 1C is shown in more detail. The return spring 26 is constructed of an active material component having predetermined properties, such as an SMA having a stiffness value that varies actively in response to an applied electrical current from the voltage source 70, or passively from heat of the fluid. For example, the return spring 26 may be constructed of an SMA that remains in a martenistic (m) phase unless and until it is actively or passively heated above a characteristic temperature ($A_F$). For active heating, the voltage source 70 may be electrically connected to the return spring 26 to conductively heat the return spring 26 as needed. When the return spring 26 is heated to a temperature exceeding the characteristic temperature ($A_F$), a solid-state transformation occurs, and the return spring 26 enters the austenite phase or a-phase. As will be understood by those of ordinary skill in the art, this m-phase to a-phase solid-state transformation may be accompanied by an approximately 300 percent increase in the elastic modulus of the return spring 26, and a corresponding increase in its spring stiffness K.

The return spring 26 is therefore configured to have an asymmetric stiffness, i.e. an initial stiffness of $K_i$ and a different final stiffness of $K_f$. The initial stiffness ($K_i$) is selected as a value that is sufficient for moving the spool 25 in the direction of arrow A, such as when fluid pressure (arrow HP) is admitted into the apply chamber 32A, to allow a rapid transition of the interlock system 10A (see FIGS. 1B and 1C) from a park (P) position to an out-of-park (OP) position. This is accomplished by reducing the resistance faced by the spool 25 as it moves in the direction of arrow A.

When the interlock system 10A is placed in a park (P) position or is engaged, the return spring 26 is resistively heated above the characteristic temperature ($A_F$). The controller 19 (see FIGS. 1B and 1C) receives a signal from the shift lever 17 (see FIGS. 1A and 1B) that "park" has been selected, and immediately closes a circuit connection 15 to allow electrical current to flow through the return spring 26. The rapid increase in stiffness from $K_i$ to $K_f$ allows the spool 25 to move in the direction of arrow R against any backpressure applied at HP fluid control port 44. As described above, motion of the spool 25 in the direction of arrow R forces the locking member 12 into the notch 13 (see FIG. 1A).

Figure 4A:
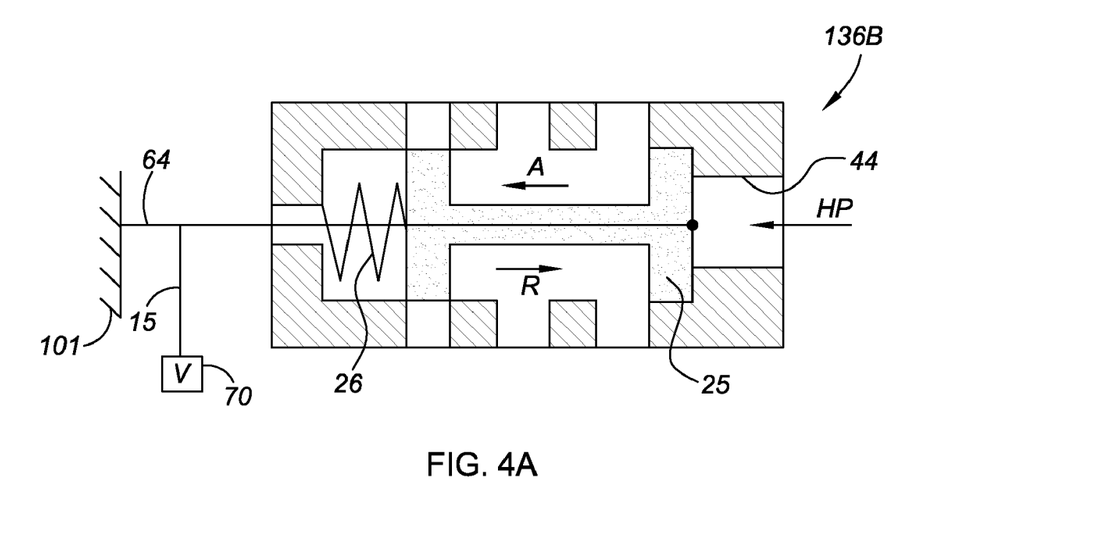
FIG. 4A is a schematic cross-sectional illustration of another embodiment of the active material-based servo valve of FIG. 3.

Referring to FIG. 4A, another embodiment of the servo valve 36B of FIG. 3 is shown as a servo valve 136B. An active element 64, such as a length of SMA wire, is mechanically coupled to the spool 25 at one end, and to a support member 101, such as a vehicle body or a valve casing, at another end, providing a suitable surface against which the active element 64 may react. When actively actuated, the active element 64 may be electrically connectable to the voltage source 70 in the manner described previously hereinabove. When the interlock system 10A (see FIG. 1B) is set to park (P), the active element 64 is in a partially/wholly de-twinned martenistic or m-phase with a specified amount of pre-strain imparted to the active element 64 in the m-phase.

As the electrical current passing through the active element 64 generates heat, or when heat is otherwise applied to the active element 64, an m-phase to a-phase phase solid-state transformation is produced in the active element 64, which leads to an at least partial recovery of the pre-strain, thus shortening the active element 64 and facilitating movement of the spool 25 in the direction of arrow A. The force provided by the active element 64 aids any hydraulic force or other pressure (arrow HP) applied at the fluid control port 44 of the servo valve 136B, thus more rapidly overcoming a return force applied in the direction of arrow R by the return spring 26. An out-of-park (OP) position is achieved in this manner.

The active element 64 is kept "active" or hot until the fluid pressure (arrow HP) at the control port 44 reaches a threshold level sufficient for retaining the spool 25 in an out-of-park (OP) position (see FIG. 1C). At this point, the voltage source 70 may be disconnected, and the active element 64 is allowed to cool. As the active element 64 cools, it returns to the m-phase. When the high pressure admitted to fluid control port 44 is sufficiently relieved, the active element 64 is stretched to its original pre-strained length, i.e. its length in the m-phase, under the action of the force exerted by the return spring 26. When this happens, the assist force that active element 64 provides to move the spool 25 in the direction A dissipates to approximately zero, and the interlock system 10A is placed in a park (P) position as shown in FIG. 1B.

Figure 4B:
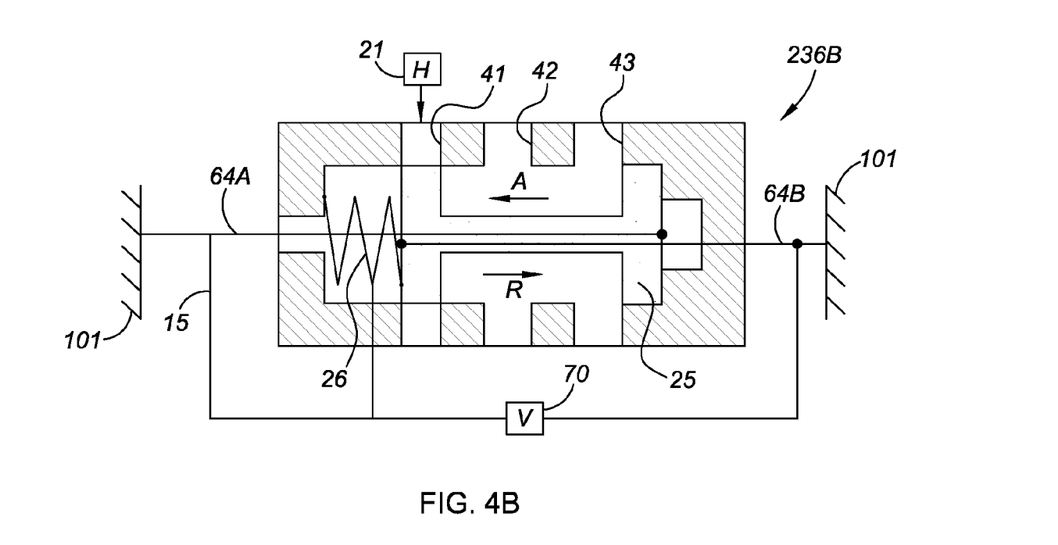
FIG. 4B is a schematic cross-sectional illustration of another embodiment of the active material-based servo valves of FIGS. 3 and 4A.

Referring to FIG. 4B, another embodiment of the servo valve 36B is shown as a servo valve 236B. In this embodiment, a first active element 64A and a second active element 64B are each mechanically coupled to the spool 25 at opposite ends thereof, with each of the active elements 64A, 64B likewise connected to a support member 101. The energizing or heating of the respective first and second active elements 64A and 64B is synchronized so as to work in an antagonistic or a push-pull manner in order to move the spool 25 alternately in the directions of arrows A and R. That is, the second active element 64B may be energized to move the spool 25 in the direction of arrow R while the first active element 64A is de-energized. Subsequently, the first active element 64A may energize and the second active element 64B de-energized to move the spool 25 in the direction of arrow A. Both the first and second active elements 64A and 64B, respectively, may be energized at different levels to control the position and motion characteristics of the spool 25. The return spring 26 and any available hydraulic pressure may reduced using this particular embodiment, and/or retained as a backup force usable in the event of temporary non-availability of the voltage source 70.

Figure 5:
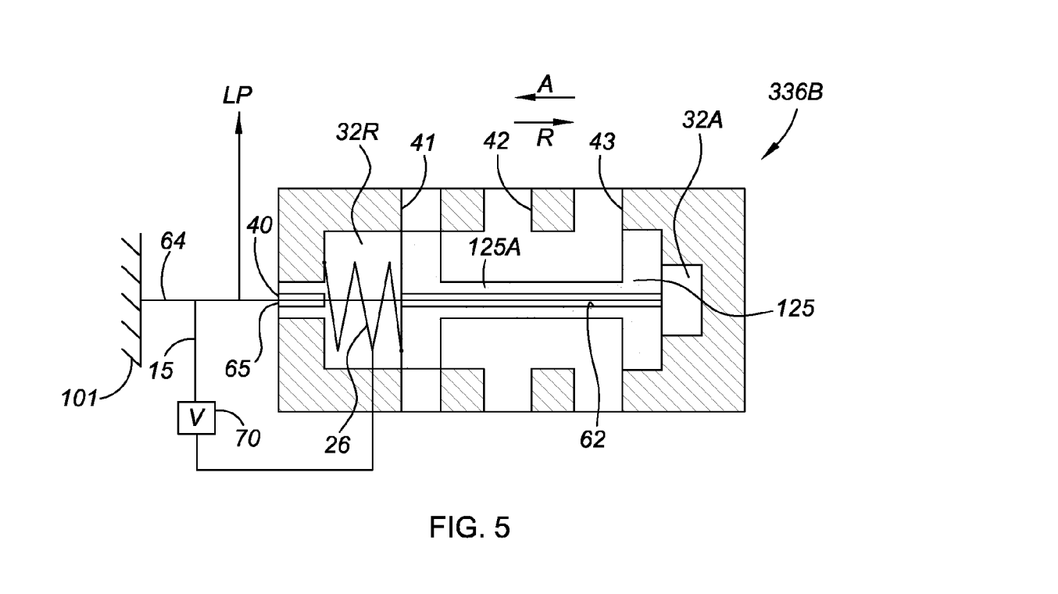
FIG. 5 is a schematic cross-sectional illustration of another embodiment of the active material-based servo valves of FIGS. 3, 4A, and 4B.

Referring to FIG. 5, another embodiment of the servo valve 36B is shown as a servo valve 336B. An alternate spool 125 is contained therein, the spool 125 having a flow channel 62 formed within a shaft portion 125A. In this embodiment, the apply chamber 32A is in fluid communication with the release chamber 32R via the flow channel 62 to allow fluid to pass as needed between the chambers 32A and 32R. The voltage source 70 is connected to an active element 64, such as an SMA wire, one end of which is connected to a stationary member 101 against which the active element 64 may react.

The active element 64 passes through a fluid seal 65 disposed within the LP fluid outlet port 40, and is also connected to the spool 125. To allow for a maximum length of the active element 64, and therefore a greater amount of length variation thereof, the active element 64 may be positioned within the flow channel 62, thus passing through the flow channel 62 and connecting to the spool 125 within the apply chamber 32A. When passing through the flow channel 62 as shown in FIG. 5, the diameter of the active element 64 and the diameter of the flow channel 62 are selected to ensure that the active element 64 does not block flow through the flow channel 62.

When the active element 64 is heated, a solid-state phase transformation is produced in the active element 64 as described above, which allows the active element 64 to pull the spool 125 in the direction of arrow A. This pulling motion of the spool 125 may be assisted by a phase transformation occurring in the return spring 26 when the return spring 26 is constructed of an active material as explained above, and selectively de-energized, as described previously hereinabove. When the voltage source 70 is subsequently disconnected and the return spring 26 is heated/energized, the active element 64 increases in length under the force exerted by the return spring 26, moving the spool 125 back in the direction of arrow R. A latch (not shown) may also be used to hold the spool 125 in the position achieved when the active element 64 is activated. This allows the element 64 to be de-energized as soon as the latch is engaged. Subsequent disengagement of the latch while active element 64 is de-energized allows the spool 125 to move in the direction of arrow R under the force exerted by the return spring 26. Thus, the servo valve 336B is operable without requiring solenoid actuation and/or hydraulic fluid pressure for moving the spool 125 using the active element 64, and optionally by also constructing the return spring 26 out of an active material such as SMA. However, as will be understood by those of ordinary skill in the art, the embodiment of FIG. 5 may be used even if the return spring 26 is conventional.

Figure 6:
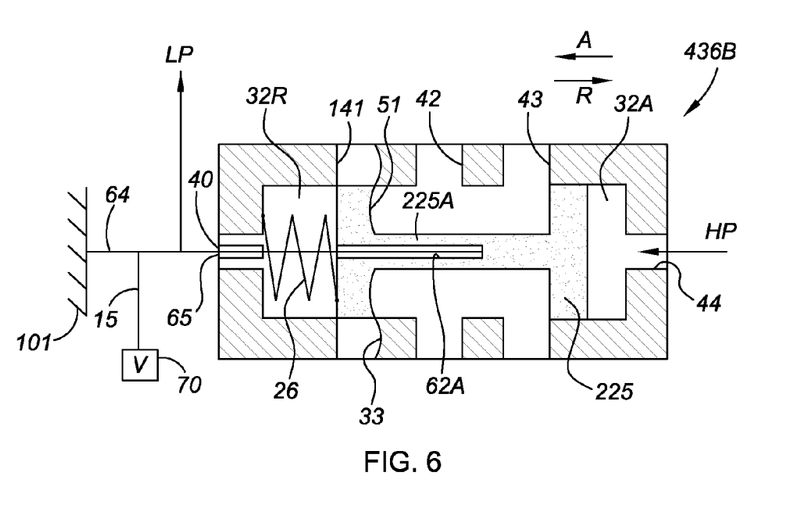
FIG. 6 is a schematic illustration of another embodiment of the active material-based servo valve of FIGS. 3, 4A, 4B, and 5.

Referring to FIG. 6, another embodiment of the servo valve 36B is shown as a servo valve 436B. A spool 225 is configured with a specially shaped surface 51, such as a concave surface as shown, while a HP fluid inlet 141 is configured with a correspondingly shaped surface 33. The return spring 26 is constructed of active materials as described above, and an active element 64 is at least partially enclosed within a partial fluid channel 62A. The active element 64 is connected to one end of the fluid channel 62A, and to a stationary member 75 against which the active element 64 may react. The fluid channel 62A acts as a reservoir as shown, as it does not pass completely through the spool shaft 225A to the apply chamber 32A as with the embodiment of FIG. 5.

According to this embodiment, when a fluid pressure (arrow HP) is admitted through the HP fluid control port 44 into the apply chamber 32A, the spool 225 is pushed or moved in the direction of arrow A. The active element 64 is energized by the voltage source 70, and the resultant conductive heat acts to contract the active element 64. Motion of the spool 225 is therefore assisted by a pull on the spool 225 resulting from a solid-state phase change produced in the active element 64. The shaped surfaces 33 at HP fluid inlet 141 and the shaped surface 51 at the spool 225 serve to increase the force exerted on the spool 225 by the fluid by increasing the change in momentum of the fluid as it passes from the HP fluid inlet 141 into the spool chamber. Thus, the motion of the spool 225 may be facilitated by the shaped surface 33 of the HP fluid inlet 41, and the selective energizing of the return spring 26, which as described above has a variable stiffness. That is, by reducing the spring stiffness as the spool 225 is moved in the direction of arrow A, and by increasing spring stiffness as the spool 225 is moved in the direction of arrow R, and therefore the overall response time of the servo valve 424 may be optimized.

Figure 7A:
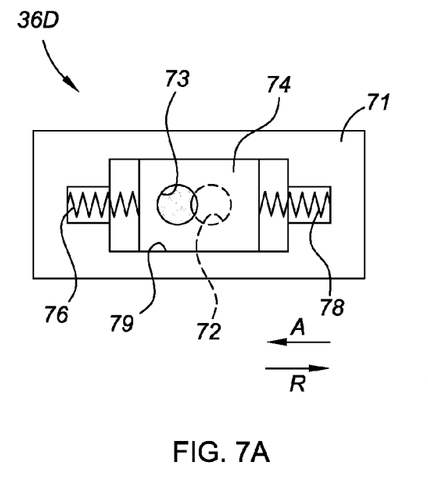
FIG. 7A is a schematic illustration of a discrete active material-based flow restrictor usable with the transmission interlock system of FIGS. 1A and 1B.

Referring to FIG. 7A, the flow restrictor device 36D of FIGS. 1B and 1C is shown as a variable flow restrictor (VFR), and may be used with the interlock system 10A of FIGS. 1B and 1C to reduce the response time thereof, in particular by reducing an amount of pressure drop occurring within the interlock system 10A. The flow restrictor device 36D, referred to hereinafter as the VFR 36D, includes a valve body or valve block 71 containing a moveable flow restrictor element 74, such as a moveable flow restrictor plate configured for sliding or moving within a groove 79 inside the valve block 71. The VFR 36D has an inlet port 72 and an outlet port (not shown), and the restrictor element 74 has an orifice 73, which is moveable within the valve block 71 to alternately separate and align the input port 72 from the output port (not shown) to thereby control the flow therethrough.

One end of the restrictor element 74 is operatively connected to a conventional spring 76, while the other end is connected to an SMA spring 78. Both of the springs 76, 78 are strained when a system using the springs 76, 78 is assembled. The SMA spring 78 is passive in this embodiment in the sense that it is not conductively heated by any external voltage source, such as the voltage source 70 (see FIG. 7B). Rather, the SMA spring 78 derives the heat required for a solid-state phase transformation from the ambient temperature of a supply of fluid flowing therethrough.

Therefore, the SMA spring 78 is constructed of an active material component that remains in the a-phase at a desired normal operating temperature, i.e. $A_F \leq T_{AMBIENT}$. When the ambient temperature ($T_{AMBIENT}$) drops below a desired characteristic temperature ($M_S$), the SMA spring 78 undergoes a solid-state phase transformation into the m-phase. As the m-phase has a lower elastic modulus than the a-phase, the stiffness of the SMA spring 78 decreases as the ambient temperature ($T_{AMBIENT}$) drops below the desired characteristic temperature ($M_S$). This disturbs the static equilibrium between the opposing springs 76 and 78, and the restrictor element 74 moves or shifts in the direction of arrow R to restore equilibrium.

Still referring to FIG. 7A, this shift of the restrictor element 74 aligns more of the orifice 73 with the inlet port 72 and outlet port (not shown), thus increasing the available flow area and reducing pressure drop of the fluid as it flows from inlet port 72 to the outlet port (not shown). The a-to-m phase transformation is complete, and the inlet ports 72 and orifice 73 are fully aligned, when the temperature of the SMA spring 78 drops below a final characteristic temperature $M_F$. The values of the various characteristic temperatures may be selected in accordance with the intended design, and therefore the temperature range over which the a-phase to m-phase and m-phase to a-phase transformations may occur may be adjusted by changing the composition of the SMA spring 78.

Figure 7B:
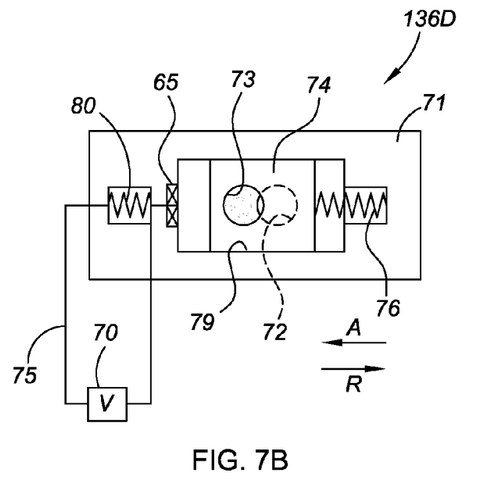
FIG. 7B is a schematic illustration of another embodiment of the discrete active material-based flow restrictor of FIG. 7A.

Referring to FIG. 7B, another embodiment of another VFR device 136D uses an SMA spring 80 connected to a voltage source 70. In this embodiment, the SMA spring 80 is active, i.e. is energized by an external stimulus such as voltage source 70. A seal 65 may be provided between the SMA spring 80 and the restrictor element 74 in the event wetting of the SMA spring 80 is not desired. The SMA spring 80 and a conventional spring 76 are strained when the system is assembled. In this alternate embodiment, the m-phase to a-phase transformation is initiated by connecting the SMA spring 80 to the voltage source 70, i.e. via resistive heating, which increases the stiffness of the SMA spring 80 to push the restrictor element 74 in the direction of arrow A by overcoming the return force in the direction of arrow R provided by the conventional spring 76. As will be understood by one of ordinary skill of the art, the SMA springs 78 and 80 in FIGS. 7A and 7B, respectively, may be replaced by another SMA element (e.g. a wire) with appropriate modifications to the design, for example as disclosed at FIGS. 4-6.

Figure 8:
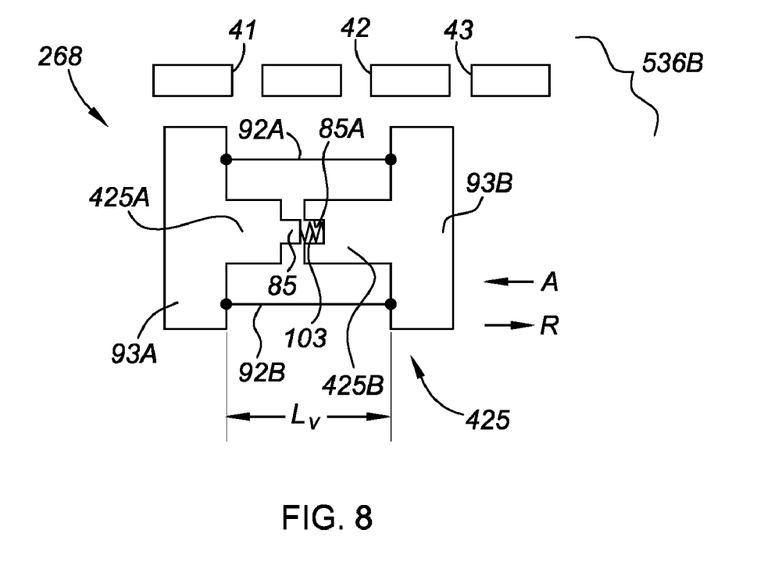
FIG. 8 is a schematic cross-sectional illustration of spool useable with the active material-based servo valve of FIGS. 1A and 1B.

Referring to FIG. 8, an alternate embodiment of the servo valve 36B of FIGS. 1B and 1C is shown as the servo valve 536B. A spool 425 includes a first shaft portion 424A connected to or formed integrally with an end portion 93A at one end, and having a protrusion 85 that is repositionable within a mating bore 84 of a second shaft portion 424B. The second shaft portion 424B is operatively connected to or formed integrally with another end portion 93B. A pair of substantially identical active elements 92A and 92B, such as SMA wires described previously hereinabove, are operatively connected to each of the end portions 93A and 93B, thus spanning a variable length $L_V$ therebetween. A biasing spring 103 is interposed between the end portions 93A and 93B such that the spring 103 serves to keep the variable length $L_V$ at its maximum designed value. When active elements 92A and 92B are conductively heated by the voltage source 70, they contract, thereby compressing the spring 103 and reducing the variable length $L_V$. This allows the end portion 93A to move toward end portion 93B. The protrusion 85 of the first shaft portion 424A is moved fully into the mating bore 84 of the second shaft portion 424B.

In this manner, the distance through which the spool 425 as a whole must move in order to control the flow of fluid through the servo valve 424 is reduced, thereby reducing the response time of the servo valve 536B. Even a small reduction in the distance that the spool 425 must move for "cracking" the servo valve 536B can lead to a significant reduction in the response time of the servo valve 536B. Once the spool 425 has moved to a desired position, the active elements 92A and 92B may be de-energized. The spring 103 will then overcome the force exerted by the active element 92A, 92B to move the spool ends 93A and 93B apart as shown in FIG. 8. In this position, the spool 425 is able to better seal the port 43 and thus reduce leakage.

Figure 9A:
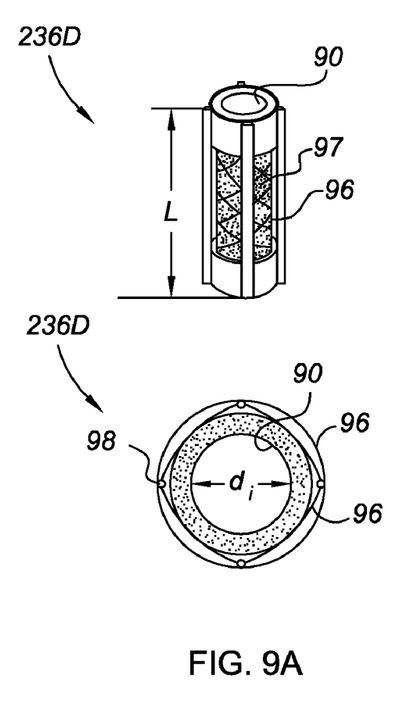
FIG. 9A is a perspective side view and cross-sectional top view of an active material-based flow restrictor device usable within the transmission interlock system of FIGS. 1A and 1B.
Figure 9B:
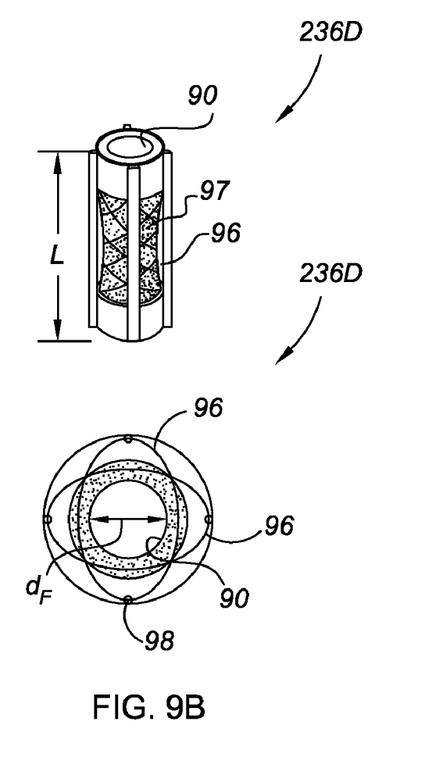
FIG. 9B is a perspective side view and cross-sectional top view of the active material-based flow restrictor device of FIG. 9A in a restricted state.

As will now be described with reference to FIGS. 9A, 9B, and 10, as an alternative to the respective VFR devices 36D and 136D of FIGS. 7A and 7B, the VFR devices 236D and 336D may be used to adjust the geometry of a flexible fluid passage using active materials. Referring first to FIGS. 9A and 9B, the VFR device 236D includes a fluid passage 90 having an initial diameter ($d_i$) and a centerline 30 along a length L of flexible tubing 97. An active mesh, i.e. a mesh of active elements 96, such as SMA wires, is wrapped around or otherwise surrounds the flexible tubing 97. When the active elements 96 are relatively cool, i.e. are subjected to an ambient temperature less than a characteristic temperature, the profile shown in FIG. 9A is produced, thus allowing a greater volume of fluid to flow per unit time. When the active elements 96 are passively or actively energized, for example by heating in the case of SMA wires, while their ends 98 are remain fixed/held such that the active elements 96 may not rotate and remain separated by a fixed distance, the active elements 96 will contract, thus reducing or restricting the effective diameter of the fluid passage 90 to $d_F$ as shown in FIG. 9B. In this manner, a flow rate through a particular location or segment within the interlock system 10A of FIGS. 1B and 1C may be controlled, with a corresponding improvement in response times. The effective diameter is defined as $d_e = \mathrm{SQRT}[4Q/\Pi v]$, where Q=the flow rate of fluid through the fluid passage 90 and v=the flow velocity through a cross-section that is perpendicular to the centerline of the fluid passage 90.

Figure 10:
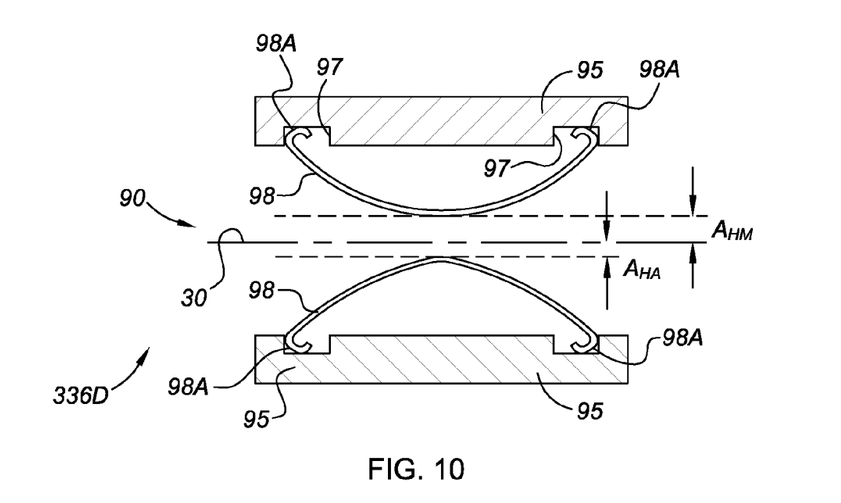
FIG. 10 is a schematic illustration of another embodiment of a distributed active material-based flow restrictor device usable with the transmission interlock system of FIGS. 1A and 1B.

Referring to FIG. 10, another VFR device 336D includes a fluid passage 90A defined by rigid support walls 95. The rigid support walls 95 have a pair of circumferential grooves 97 in which an end 98A of an active material wall 98 is positioned, and against which the end 98A may react when energized. The active material wall 98 is in the a-phase under normal or higher temperature conditions, as shown below the centerline 30. The area of flow in the a-phase is limited to $2 \times A_{HA}$. When the ambient temperature of the fluid (not shown) drops below a characteristic temperature $M_S$, the SMA starts transitioning to the m-phase, as shown above the centerline 28, with the transition complete at a final characteristic temperature $M_F$. The reduction in stiffness of the active material wall 98 allows the active material walls 98 to deform in response to pressure from the fluid flowing therethrough, leading to a low temperature configuration shown above centerline 30. In the m-phase, the flow area is increased to $2 \times A_{HM}$.

Referring to FIG. 2, as explained previously above the inlet valve 28 of FIGS. 1B and 1C may be actuated using an electromechanical solenoid 28A having an outer housing 60 and a stationary ferrous core 56. The housing 60 at least partially encloses or contains a moveable armature 55 constructed of a suitable active material component. In one embodiment, a conductive wire coil 61 surrounds the armature 55, with the armature 55 being constructed of an active material component having predetermined magneto-strictive qualities, and around which the wire coil 61 is wrapped. A return spring 57 is positioned between the armature 55 and the housing 60, and voltage source 70 is electrically connected to the wire coil 61. The voltage source 70 is normally off, disconnected, or otherwise not energized when the interlock system 10A (see FIGS. 1B and 1C) is disengaged or placed in a park (P) position as shown in FIG. 1B. The concept of using an asymmetric return spring (see FIG. 3) may also be used within the solenoid 28A to improve its response time.

When the wire coil 61 is energized by the voltage source 70, an electrical current is caused to flow through the wire coil 61 and induce a magnetic field around the armature 55, as will be understood by those familiar with the underlying field theory of conventional electromechanical solenoids. The induced magnetic field and resultant field coupling effect between the armature 55 and the ferrous core 56 forces the armature 55 toward the ferrous core 56 in the direction of arrow D. This motion may be used to open a fluid passage such as fluid channel 29 (see FIGS. 1A, 1B, and 1C). However, the usual response time of this motion may be reduced by the concurrent shortening of the active material component, i.e. the armature 55, in response to the induced magnetic field, thus opening the inlet valve 28 more rapidly. Likewise, when the voltage source 70 is shut off or de-energized, the magnetic field ceases to be induced, and the armature 55 regains its original length, both moving the armature 55 back in the direction of arrow E. When this occurs, hydraulic pressure to the servo valve 36B (see FIGS. 1A and 1B) is discontinued, and the interlock system 10A is placed in the out-of-park (OP) position as shown in FIG. 1C.

Figure 11A:
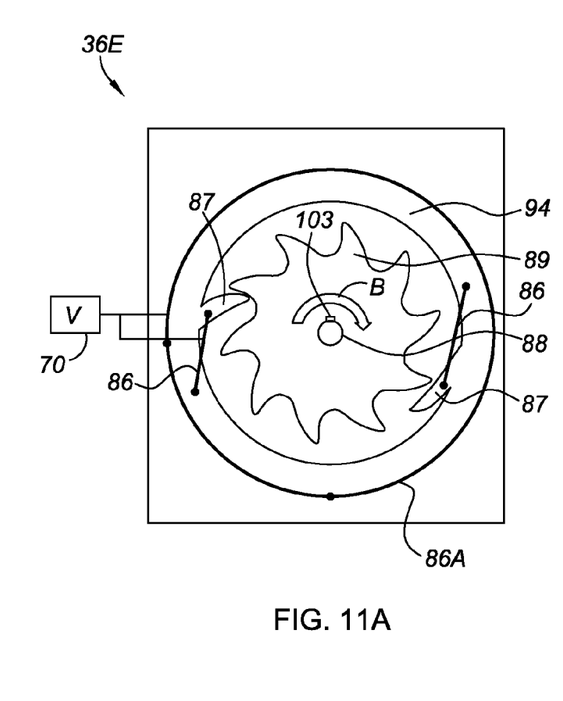
FIG. 11A is a schematic front view of a fluid control device configured as an active material-assisted fluid motor.
Figure 11B:
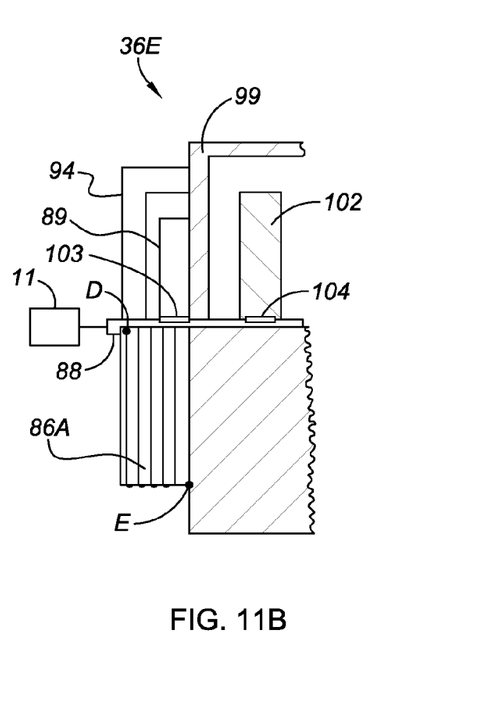
FIG. 11B is a schematic partial cross-sectional side view of the active material-assisted fluid motor of FIG. 11A.

Referring to FIGS. 11A and 11B, one or more FCD 36 (see FIG. 1) may be alternatively configured as an active material-assisted rotary actuator or fluid motor 36E. For example, the cylinder device 36C (see FIGS. 1B and 1C) or another linear motion actuator device may be replaced with the fluid motor 36E, with the fluid motor 36E being powered or driven using the pressurized fluid (arrows HP). The fluid motor 36E may be operatively connected to an output load 11 to rotate or move the output load 11 as desired. The fluid motor 36E includes a rotor shaft 88 that is operatively connected to a rotor portion 102 to rotate in conjunction with the rotor portion 102 in response to the fluid pressure (arrows HP), as will be understood by those of ordinary skill in the art. The rotor shaft 88 may be splined, keyed, or otherwise connected to a geared or toothed ratchet portion 89 at 103 so that the ratchet portion 89 rotates in conjunction with the rotor portion 102.

To assist the response of the fluid motor 36E, such as during relatively low temperatures lowering the viscosity of any fluid used to drive the fluid motor 36E, and particularly for assisting the fluid motor 36E during start-up, a clutch rotor 94 may be selectively rotated and engaged with the ratchet portion 89, such that an induced rotation of the clutch rotor 94 acts to assist the rotation of the rotor portion 102. The clutch rotor 94 is operatively connected to or formed integrally with one or more fingers or pawls 87. Each of the pawls 87 may be configured as compliant segments that are formed integrally with the clutch rotor 94, or as separate portions that are operatively connected to the clutch rotor 94, such as by using pivots or other joints (not shown). Each of the pawls 87 are operatively connected to an active element 86 as described previously hereinabove, and which may be selectively activated by applying a stimulus, such as the voltage source 70 or another stimulus, to thereby deform, pull, and/or otherwise move the pawls 87 into engagement with the ratchet 89. In this manner, the clutch rotor 94 is mechanically coupled to the rotor portion 102 for common rotation in one direction, such as the direction of arrow B in FIG. 11A, while freewheeling in the opposite rotational direction. When the active elements 86 are de-activated, the pawls 87 return to their initial de-energized position and are no longer engaged with the ratchet portion 89, and there is no stress placed on the clutch rotor 94.

The clutch rotor 94 may be selectively rotated by activating another active element 86A which is wrapped, wound, or coiled around the clutch rotor 94. As shown in FIG. 11B, one end D of the active element 86A is anchored or connected to the clutch rotor 94, while another end E of the active element 86A is anchored or connected to a motor casing 99 or another stationary member. When the active element 86A is activated by a stimulus, it rotates the clutch rotor 94 relative to the motor casing 99. If the pawls 87 are engaged with the ratchet portion 89 when this rotation occurs, the clutch rotor 94 drives the ratchet portion 89 and the rotor portion 102. This occurs even if the existing rotation of the rotor portion 102 is insufficiently sustained by any existing rate of flow of pressurized fluid (arrows HP) through the fluid motor 36E. Thus, the active material elements 86 and 86A assist the rotation of the rotor portion 102 and enable any fluid motor 36E so equipped to respond more quickly upon start-up, and particularly under relatively low operating temperatures than would otherwise be possible when using fluid pressure alone.

The active element 86A imparts a finite rotation to the clutch rotor 94 depending on the stroke of the active elements 86A, after which the active elements 86 are de-activated. The elastic restoring forces of the active elements 86 then cause the pawls 87 to disengage from the ratchet portion 89 and return to their initial or disengaged positions, thereby decoupling the clutch rotor 94 from the ratchet portion 89 and rotor portion 102. The active element 86A is then de-activated, and a restoring spring (not shown) may be used to rotate the clutch rotor 94 to its initial or de-activated position, thus "resetting" the clutch rotor 94. Subsequent motion of the rotor portion 102 is expected to be sustained by any fluid pressure (arrows HP), with the active elements 86, 86A providing the initial boost necessary during start up of the fluid motor 36E. However, if active material assistance is desired over a longer duration, the reset step may be followed by another activation, i.e. another application of a stimulus, and optionally by using a sufficient number of and/or by multiplexing a number of active elements 86, 86A to maintain a sufficiently high rotational speed of the clutch rotor 94. The geometry shown in FIGS. 11A and 11B is for illustrative purposes, and other geometries and/or configurations may be used within the scope of the invention.

Figure 12:
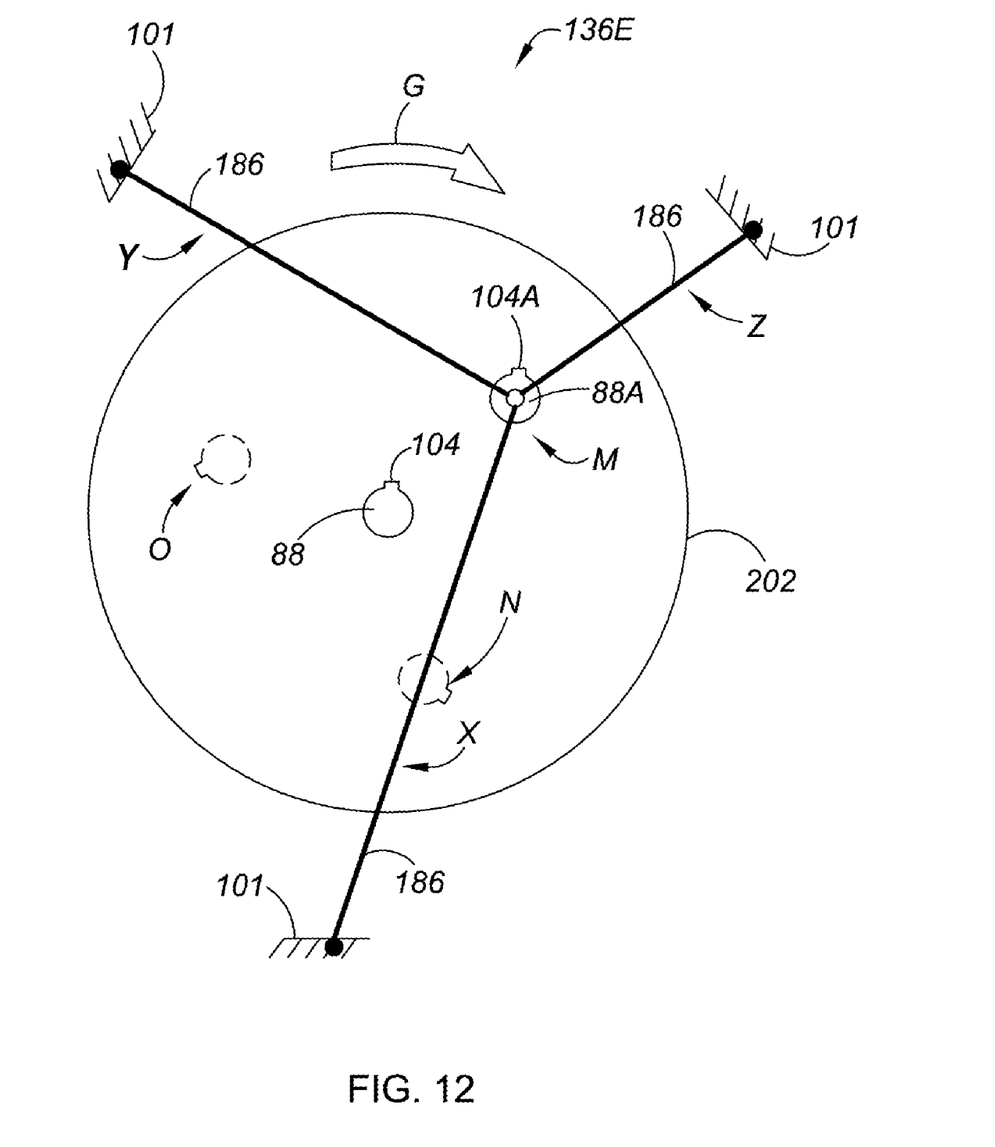
FIG. 12 is a schematic side view of an active material-assisted fluid motor according to another embodiment.

Referring to FIG. 12, one or more of the fluid control devices (FCD) 36 shown in FIG. 1 may be alternatively configured as another active material-assisted rotary actuator or fluid motor 136E. As with the fluid motor 36E shown in FIGS. 11A and 11B and described above, the fluid motor 136E may be operatively connected to an output load 11 as shown in FIGS. 11A and 11B to rotate or move the output load 11 as desired. Also as with the fluid motor 36E of FIGS. 11A and 11B, the fluid motor 136E includes a rotor shaft 88 that is splined, keyed, or otherwise connected at 104 to an alternate rotor portion 202, with the rotor shaft 88 and the rotor portion 202 rotating in conjunction in response to a fluid pressure, as will be understood by those of ordinary skill in the art.

The rotor portion 202 includes an offset shaft 88A that is positioned off-axis, i.e. that is not coaxially aligned with the rotor shaft 88, with the offset shaft 88A being splined, keyed, or otherwise connected at 104A to the rotor portion 202. The fluid motor 136E includes a plurality of active elements 186, which may be configured as SMA wires as shown in FIG. 12, as SMA springs (not shown), or another suitable active element. Each active element 186 is operatively connected at one end to the offset shaft 88A, and at another end to the support member 101 as described previously hereinabove. The end of the active elements 186 connecting to the offset shaft 88A can have a relative rotation with respect to the offset shaft 88A. For illustrative purposes, the active elements 186 are also labeled as X, Y, and Z to describe a sequence of operation of the fluid motor 136E.

During normal operation of the fluid motor 136E, each of the active elements 186 are inactive, and therefore each of the active elements 186 will be alternately stretched to the length of the active element 186 that is also labeled "X" in FIG. 12 once per rotation of the rotor portion 202, i.e. as the offset shaft 88A rotates in the direction of arrow G through the positions M, N, and O, and back again to the initial position M, or alternately in the opposite direction of arrow G. While inactive, none of the active elements 186 exert any resistance to the rotation of the rotor portion 202.

In order to initiate, start, or assist in the rotation of the rotor shaft 88 and rotor portion 202 such as might be desirable at a relatively low temperature, the active element 186 that is also labeled "X", and which represents a "ready" element, is activated as described hereinabove, such as by selectively applying a stimulus in the form of a voltage from the voltage source 70. The stimulation of the active element 186 labeled "X" shortens this active element 186, and thereby exerts a force on the rotor portion 202, rotating it in the direction of arrow G within FIG. 12. During the rotation, the active element 186 also labeled "Y" will be stretched, as will, to a greater degree, the active element 186 also labeled Z. The active elements 186 may be selectively activated and de-activated in a particular order, such as X, Y, Z, to fully rotate the rotor portion 202 through one complete revolution or rotation.

In the configuration shown in FIG. 12, each active element 186 covers a range of motion of 120°, although each may be used up to 180° with a resultant loss in efficiency, i.e. moment arm length. Additionally, the actual positioning of the offset shaft 88A with respect to the rotor shaft 88 may be varied from the position shown in FIG. 12 within the scope of the invention, as at least one active element 186 will remain ready for activation at any given moment, and therefore positioned for at least assisting in the initial rotation of the rotor portion 202. Likewise, although three active elements 186 are shown in the embodiment of FIG. 12, those of ordinary skill in the art will recognize that additional active elements 186 may be used to increase rotational efficiency.

As will be understood by those of ordinary skill of the art, other active materials may be used with the servo system 10 (see FIG. 1), with various other activation means, and therefore the various FCD 36 of the invention may include other devices not shown in the various Figures. For example, in a fluid passages 29 of FIG. 1, or in any restricted and/or critical flow passage within the servo system 10 (see FIG. 1), by using a magnetorheological fluid as described above and placing a permanent magnet in the flow passage, one could modify the effective fluid viscosity or the yield stress. Using magnetostrictive (MR) materials as described above, the magnet could be placed as needed to optimize its influence on the active material. Alternately, using photo-chemically activated polymer active elements, a light source for activating the active elements could be placed in proximity to the active element, typically within line-of-sight of the active element. In any case, the various stimulus may be active or passive, with the stimulus generator positioned with respect to the active material or element to enable the most efficient transfer of the stimulus.

Accordingly, within the scope of the invention, by augmenting a fluid-based servo system such as the servo system 10 of FIG. 1 with active elements as described hereinabove, the resultant servo system is optimized in size and speed, while allowing easier retrofits and passive operation. That is, active material elements require a much smaller size and weight than alternative devices because they have a higher specific energy density. The active elements can respond more quickly than conventional devices due to the reduction in system inertia the active elements provide, along with a potential reduction in moving parts. Retrofits are made easier because the electrical signals already used to drive various solenoids in a fluid system may, in many cases, be diverted to drive the active elements, facilitating the replacement of the solenoid-actuated components with active material-actuated versions. Finally, some concepts described hereinabove provide passive actuation, such as temperature compensation, to provide a more consistent system performance over a wider range of temperatures. This leads to a fluid system that has consistent operation without significant additions to system cost and/or complexity.

While the best modes for carrying out the invention have been described in detail, those familiar with the art to which this invention relates will recognize various alternative designs and embodiments for practicing the invention within the scope of the appended claims.

The invention claimed is:

1. A servo system that is configured for selectively moving an output load, and comprising:
a supply of pressurized fluid; and
a fluid control device (FCD) in fluid communication with said supply of pressurized fluid, and having at least one active element constructed of an active material, said FCD being operable for moving the output load via a force from said supply of pressurized fluid;
wherein said active material has a property that is selectively variable using an applied stimulus to thereby assist said force in moving the output load only under a threshold condition, and to thereby optimize a response of the servo system during the threshold condition.

2. The servo system of claim 1, further comprising a first valve for selectively admitting fluid from the supply to the FCD, wherein said FCD is a second valve having said at least one active element, and wherein an application of said stimulus to said at least one active element varies said property to thereby change a flow rate of said supply of pressurized fluid through the second valve during said threshold condition.

3. The servo system of claim 2, wherein said second valve is configured as a servo valve having a moveable spool portion that is operatively connected to said at least one active element and that is moveable in response to said force, and
wherein an application of said stimulus to said at least one active element during said threshold condition selectively varies a speed of movement of said moveable spool portion to thereby change said flow rate of said supply of pressurized fluid through the second valve.

4. The servo system of claim 1, wherein said FCD is a valve having a fluid passage that is operatively connected to said at least one active element, and wherein the servo system is operable for modifying an effective diameter of said fluid passage by applying said stimulus to said at least one active element.

5. The servo system of claim 1, wherein said FCD is an actuator device having a moveable portion that is operatively connected to the output load and to said at least one active element, and that is movable in response to said force;
wherein an application of said stimulus to said at least one active element varies a speed of movement of said moveable portion to thereby reduce a time required for moving the output load.

6. The servo system of claim 5, wherein said actuator device is selected from the group consisting of a cylinder device and a fluid motor.

7. The servo system of claim 6, wherein said actuator device is said fluid motor having a rotor portion;
wherein said at least one active element is operatively connected to said rotor portion and configured for applying a rotational force to said rotor portion when said property varies in response to said stimulus, said property being a variable length of said at least one active element.

8. The servo system of claim 1, wherein said at least one active element is a return spring configured for applying a return force to a moveable portion of said FCD, said return spring being constructed at least partially of said active material and having as said property a variable spring stiffness that varies in response to said stimulus.

9. The servo system of claim 1, wherein said supply of pressurized has a variable viscosity, and is selected from the group consisting of a magneto-rheological fluid (MRF), an electro-rheological fluid (ERF), and a pseudo-plastic fluid.

10. The servo system of claim 1, wherein said servo system is configured as an interlock system for moving a vehicle transmission between a park position and an out-of-park position.

11. A servo system comprising:
a supply of pressurized fluid; and
a fluid control device (FCD) including at least one active element, the at least one active element having a variable property that varies in response to an applied stimulus to thereby assist in a movement of an output load, said FCD being operable for transmitting pressure from said supply of pressurized fluid to move said output load;
wherein said output load is operatively connected to said FCD, and is moveable from a first position to a second position in response to a movement of a moveable portion of said FCD; and
wherein said FCD is configured as one of a fluid motor having a rotor portion and variable flow restrictor having a fluid passage with an effective diameter, said at least one active element being operatively connected to a corresponding one of:

said rotor portion when said FCD is said fluid motor, and adapted for assisting in a rotation of said rotor portion when said variable property varies in response to said applied stimulus; and said fluid passage when said FCD is said variable flow restrictor, and adapted for constricting said fluid passage in response to said applied stimulus, thereby modifying the effective diameter of said fluid passage.

12. The servo system of claim 11, further comprising a second FCD having a second active element, said second FCD being configured as a servo-valve having a moveable spool that is operatively connected to said second active element;

wherein an application of another applied stimulus to said second active element varies a variable property of said second active element to assist in a movement of said moveable spool to thereby optimize a response of the servo system in moving said output load from said first position to said second position.

13. The servo system of claim 12, wherein said second FCD includes a third active element, and wherein said second active element has a variable property that is selectively variable in coordination with a variation of said variable property of said third active element to thereby facilitate said movement of said moveable spool portion.

14. The servo system of claim 13, wherein said moveable spool includes a shaft portion having a fluid channel for facilitating a flow of said supply of pressurized fluid from one side of said servo valve to another side of said servo valve.

15. The servo system of claim 11, wherein said at least one active element is positioned with respect to said fluid passage, and is configured as an active mesh constructed of said active material having said variable property, and wherein an application of said stimulus to said active mesh constricts said fluid passage to thereby reduce said effective diameter.

16. The servo system of claim 11, wherein the servo system is configured as an interlock system for moving a vehicle transmission between a park position and an out-of-park position.

17. A method for moving an output load in a servo system having a source of pressurized fluid, the method comprising:

providing a fluid control device (FCD) in fluid communication with the source of pressurized fluid, the FCD including an active element having a selectively variable property;

operatively connecting an output load to the FCD;

determining the presence of a threshold condition;

activating said active element using a stimulus only during the threshold condition to thereby vary said variable property, and to thereby generate an augmenting force;

transmitting a force from the supply of pressurized fluid through said FCD to move the output load; and moving the output load from a first position to a second position during the threshold condition using the force from the supply of pressurized fluid and the augmenting force, and using only the force from the supply of pressurized fluid when the threshold condition is not present.

18. The method of claim 17, further comprising:

providing a second FCD with a second active element having a second variable property, said second FCD being between the FCD and the output load; and activating said second active element using a second stimulus to thereby vary said second variable property.

19. The method of claim 18, further comprising:

configuring a portion of said output load as a locking member for a vehicle transmission; and selectively locking said vehicle transmission in a park position by moving said locking member from said first position to said second position.

* * * * *